US012217745B2

(12) United States Patent
Qian et al.

(10) Patent No.: US 12,217,745 B2
(45) Date of Patent: *Feb. 4, 2025

(54) UNIFIED SPEECH REPRESENTATION LEARNING

(71) Applicant: Microsoft Technology Licensing, LLC, Redmond, WA (US)

(72) Inventors: Yao Qian, Bellevue, WA (US); Yu Wu, Beijing (CN); Kenichi Kumatani, Sammamish, WA (US); Shujie Liu, Beijing (CN); Furu Wei, Beijing (CN); Nanshan Zeng, Bellevue, WA (US); Xuedong David Huang, Yarrow Point, WA (US); Chengyi Wang, Jinan (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,888

(22) Filed: Jul. 3, 2023

(65) Prior Publication Data

US 2023/0368782 A1 Nov. 16, 2023

Related U.S. Application Data

(63) Continuation of application No. 17/320,496, filed on May 14, 2021, now Pat. No. 11,735,171.

(51) Int. Cl.
*G10L 15/187* (2013.01)
*G06N 20/00* (2019.01)
*G10L 15/02* (2006.01)
*G10L 15/06* (2013.01)
*G10L 15/22* (2006.01)

(52) U.S. Cl.
CPC ............ *G10L 15/187* (2013.01); *G06N 20/00* (2019.01); *G10L 15/02* (2013.01); *G10L 15/063* (2013.01); *G10L 15/22* (2013.01); *G10L 2015/025* (2013.01)

(58) Field of Classification Search
CPC ..... G10L 15/187; G10L 15/02; G10L 15/063; G10L 15/22; G10L 2015/025; G06N 20/00
USPC ......................................................... 704/243
See application file for complete search history.

(56) References Cited

U.S. PATENT DOCUMENTS

| 11,735,171 B2 * | 8/2023 | Qian ....................... G10L 15/02 |
| | | 704/243 |
| 2019/0266246 A1 * | 8/2019 | Wang ....................... G10L 15/28 |
| 2022/0366898 A1 * | 11/2022 | Qian ....................... G10L 15/187 |
| 2023/0368782 A1 * | 11/2023 | Qian ....................... G06N 3/096 |

* cited by examiner

*Primary Examiner* — Michael N Opsasnick
(74) *Attorney, Agent, or Firm* — Workman Nydegger (57) ABSTRACT

A system obtains a first training data set comprising labeled speech data or both labeled and unlabeled data corresponding to a high-resource data set as well as latent speech representations based on the first training data set. The system trains a machine learning model on the first training data set to learn phonetically aware speech representations corresponding to the first training data set. The system applies the latent speech representations to a transformer context network to generate contextual representations. The system aligns each of the contextual representations with a phoneme label to generate phonetically-aware contextual representations. The system causes a refinement engine to further refine the machine learning model.

20 Claims, 7 Drawing Sheets

UNIFIED SPEECH REPRESENTATION LEARNING

CROSS-REFERENCE TO RELATED APPLICATIONS

This application is a continuation of U.S. patent application Ser. No. 17/320,496 filed on May 14, 2021, entitled "UNIFIED SPEECH REPRESENTATION LEARNING," which application is expressly incorporated herein by reference in its entirety.

BACKGROUND

Speech recognition (SR) systems have achieved remarkable quality and have reached near-human parity in many domains. Unfortunately, conventional techniques require many thousands of hours of human annotated speech recordings for training, which are typically not available for the vast majority of the nearly 7000 languages spoken worldwide. This poses a significant challenge for building accurate and robust SR systems for low-resource languages. Even for high-resource languages, lack of training data is also a serious problem for specific domains, especially when the background noise and distorting conditions are very different from the general domain used for the initial training.

Current systems train for the low-resource speech recognition systems using either supervised or unsupervised training. During supervised training, transfer learning methods facilitate learning of features on large high-resource datasets and directly use them in similar but data-poor tasks. Though effective, such methods require large, supervised corpora for training data. In contrast, unsupervised learning methods attempt to learn contextual representations from audio data alone and then fine-tune the model with paired data. However, the self-supervised paradigm needs to be carefully designed and such representations may be difficult to interpret.

In view of the foregoing, there is an ongoing need for improved systems and methods for generating training data and training models, including the deployment of such models, for improved speech representation learning and generation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for training a machine learning model to learn phonetically aware speech representations. A first training data set comprising labeled speech data, or both labeled and unlabeled data sets is obtained and applied to a feature extractor of a machine learning model to generate latent speech representations. The latent speech representations are applied to (i) a quantizer to generate quantized latent speech representations and (ii) a transformer context network to generate contextual representations. Each contextual representation included in the contextual representations is aligned with a phoneme label to generate phonetically aware contextual representations. Quantized latent representations are aligned with phoneme labels to generate phonetically aware latent speech representations. A sub-set of the contextual representations is randomly replaced with quantized latent speech representations during their alignments to phoneme labels. Finally, the phonetically aware latent speech representations are aligned to the contextual representations using supervised learning.

Some disclosed embodiments are directed to systems and methods for learning speech representations using labeled and unlabeled training data. For example, a first training data set comprising labeled and/or unlabeled speech data corresponding to a high-resource data set is obtained to train a machine learning model on the first training data set to learn phonetically aware speech representations corresponding to the first training data set. A second training data set comprising unlabeled speech data corresponding to a low-resource data set is obtained to train the machine learning model on the second training data set using self-supervised learning.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards embodiments for training machine learning models for learning speech representations. The present invention is directed to systems and methods for unified pre-training of machine learning models to learn speech representations with both labeled and unlabeled data.

More particularly, the speech representations are learned through supervised phonetic CTC learning and phonetically aware contrastive self-supervised learning which are conducted in a multi-task learning environment. The resultant representations capture information more accurately correlated with phonetic structures and improve the generalization across languages and domains. The effectiveness of the unified speech representation learning for cross-lingual representation learning is evaluated on public speech data corpus (e.g., CommonVoice). The results show that the present invention facilitates a significant improvement in self-supervised pretraining and supervised transfer learning for speech recognition by significant percentages relative to the phone error rate reductions respectively (averaged over all testing languages). The transferability of the disclosed embodiments is also demonstrated on a domain-shift speech recognition task, i.e., facilitating a reduction of a relative word error rate against the previous approach.

The present invention is directed to embodiments that have many advantages. On the one hand, methods are provided for an integrated training process for transfer learning and contrastive learning. The systems and methods beneficially are configured to use all available data, whether labeled or unlabeled, to improve the speech recognition performance, especially in low-resource scenarios. On the other hand, when compared to the previous unsupervised models, the present systems and methods are trained on supervised data to directly guide the quantization module to learn speech recognition specific information and thus obtain a more meaningful and explainable codebook.

Figure 1:
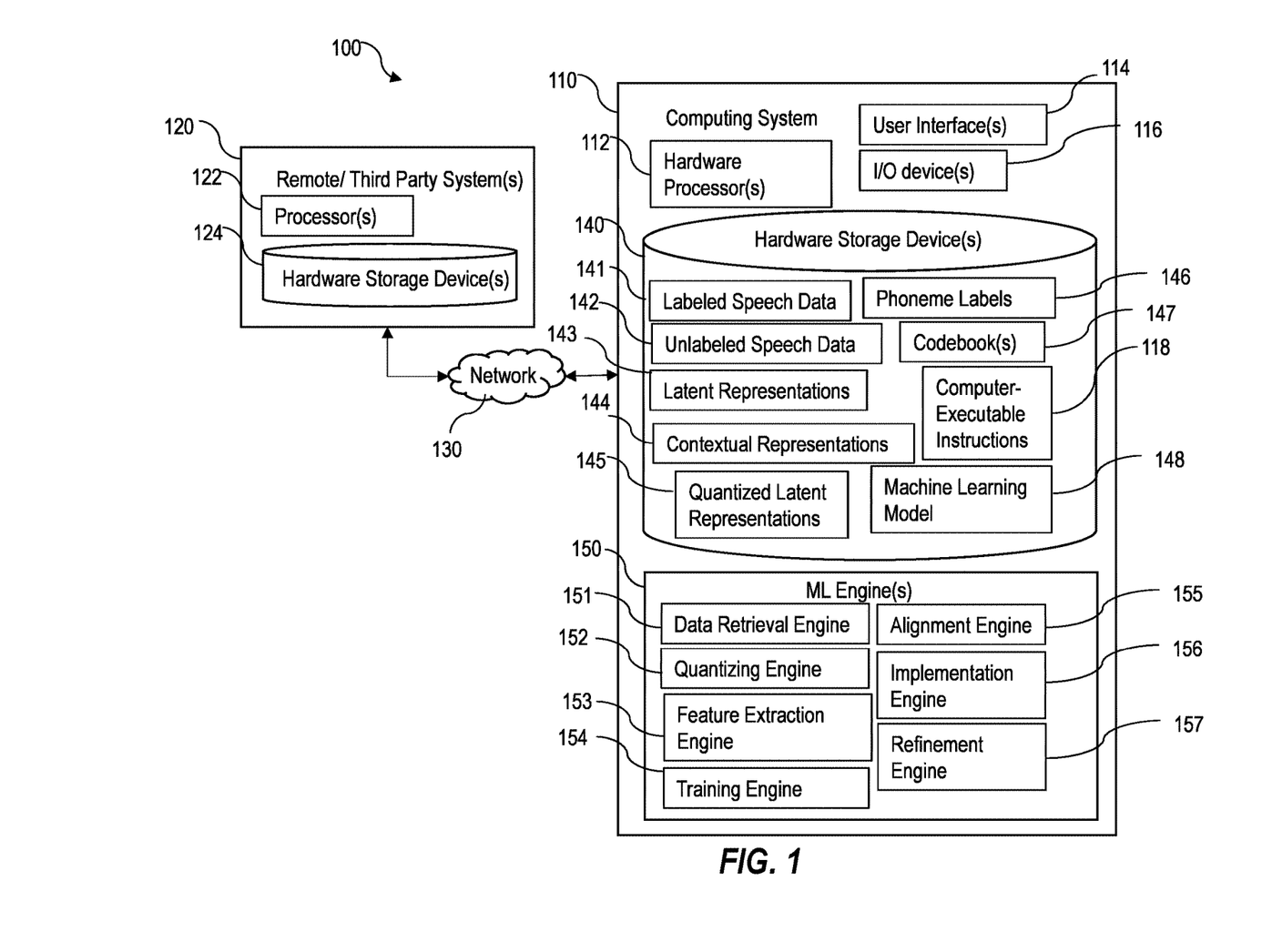
FIG. 1 illustrates a computing environment in which a computing system incorporates and/or is utilized to perform disclosed aspects of the disclosed embodiments.

Attention will now be directed to FIG. 1, which illustrates components of a computing system 110 which may include and/or be used to implement aspects of the disclosed invention. As shown, the computing system includes a plurality of machine learning (ML) engines, models, neural networks and data types associated with inputs and outputs of the machine learning engines and models.

Attention will be first directed to FIG. 1, which illustrates the computing system 110 as part of a computing environment 100 that also includes remote/third party system(s) 120 in communication (via a network 130) with the computing system 110. The computing system 110 is configured to learn and generate phonetically aware speech representations. The computing system 110 is also configured to train machine learning models, perform supervised and unsupervised learning processes, and perform loss functions.

The computing system 110, for example, includes one or more processor(s) 112 (such as one or more hardware processor(s)) and a storage (i.e., hardware storage device(s) 140) storing computer-executable instructions 118 wherein one or more of the hardware storage device(s) 140 is able to house any number of data types and any number of computer-executable instructions 118 by which the computing system 110 is configured to implement one or more aspects of the disclosed embodiments when the computer-executable instructions 118 are executed by the one or more processor(s) 112. The computing system 110 is also shown including user interface(s) 114 and input/output (I/O) device (s) 116.

As shown in FIG. 1, hardware storage device(s) 140 is shown as a single storage unit. However, it will be appreciated that the hardware storage device(s) 140 is, a distributed storage that is distributed to several separate and sometimes remote and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different data types including labeled speech data, unlabeled speech data, latent representations, contextual representations, quantized latent representations, phoneme labels, and codebooks described herein.

The storage (e.g., hardware storage device(s) 140) includes computer-executable instructions 118 for instantiating or executing one or more of the models and/or engines shown in computing system 110 (e.g., machine learning model 148). The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-executable instructions 118 corresponding to the computing system 110.

Labeled speech data 141 comprises audio data and/or audio-visual data including speech utterances with corresponding transcriptions or phoneme labeling. Unlabeled speech data 142 comprises audio data comprising speech utterances without corresponding transcriptions or phoneme labeling. Latent representations 143 are a speech representation and/or output of the feature extractor (e.g., feature extraction engine 153) based on input utterances or other speech data. Contextual representations 144 are speech representations that have been output by a transformer context network and include contextual information based on input speech utterances (e.g., labeled speech data 141 or unlabeled speech data 142). Quantized latent representations 145 include speech representations that have been output by a quantizer (e.g., quantizing engine 152) based on input speech utterances (e.g., labeled speech data 141 and/or unlabeled speech data 142). Phoneme labels 146 are phonetic information or phonetic units that are able to correspond to various portions of speech utterances. Codebook(s) 147 comprise databases or datasets of latent representations 143, contextual representations 144, quantized latent representations 145, and/or phoneme labels 146.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a quantizing engine 152, a feature extraction engine 153, a training engine 154, an alignment engine 155, an implementation engine 156, a refinement engine 157 which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as training data. The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote/third-party systems (e.g., remote/third party system (s) 120) comprising remote/third party datasets and/or data sources. In some instances, these data sources comprise visual services that record or stream text, images, and/or video.

The data retrieval engine 151 accesses electronic content comprising labeled speech data, unlabeled speech data, latent representations, contextual representations, quantized latent representations, phoneme labels, and codebooks and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired audio data processing techniques.

The data retrieval engine 151 locates, selects, and/or stores raw recorded source data wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the training engine 154 and/or implementation engine 156.

The quantizing engine 152 is configured to take as an input the latent representations 143 (as output by the feature extraction engine 153 based on speech utterances (e.g., unlabeled speech data 142 and/or labeled speech data 141). The quantizing engine 152 is guided to learn speech recognition specific information and output discrete or quantized latent representations 145. The quantizing engine 152 is configured to learn a phonetically aware codebook based on the CTC objective function.

The training engine 154 is in communication with one or more of the data retrieval engine 151, the quantizing engine 152, the feature extraction engine 153 or the implementation engine 156. In such embodiments, the training engine 154 is configured to receive one or more sets of training data from the data retrieval engine 151. After receiving training data relevant to a particular application or task, the training engine 154 trains one or more models on the training data. The training engine 154 is configured to train a model via unsupervised training and/or supervised training. The training engine 154 is configured to train one or more machine learning models various datasets, including unlabeled and/or labeled speech data.

The computing system 110 includes an alignment engine 155 that is configured to align various machine learning model outputs and/or speech representations with discrete speech representations and/or phonetic information. The alignment engine 155 is configured to align the discrete or quantized latent speech representations to meaningful phonetic units or phonemes or phoneme labels. In such embodiments, the quantized latent representations are computed based on labeled speech data. The conditional probability is then computed based on the co-occurrence between the phonemes and the latents. The alignments are built by choosing the phoneme which is most representative in the receptive field of each quantized latent representation. Many discrete latents appear to specialize in specific phonetic sounds, indicating that the present systems and methods obtain good alignment between quantized latent speech representations and labeled phonemes. Where alignment is based on a probability or conditional probability, it is sometimes referred to as a soft alignment such that the alignment engine 155 is configured to "softly" align various speech units or representations.

The computing system 110 includes an implementation engine 156 in communication with any one of the models and/or ML engine(s) 150 (or all of the models/engines) included in the computing system 110 such that the implementation engine 156 is configured to implement, initiate or run one or more functions of the plurality of ML engine(s) 150. In one example, the implementation engine 156 is configured to operate the data retrieval engines 151 so that the data retrieval engine 151 retrieves data at the appropriate time to be able to generate training data for the training engine 154.

The implementation engine 156 facilitates the process communication and timing of communication between one or more of the ML engine(s) 150 and is configured to implement and operate a machine learning model 148 (or one or more of the ML engine(s) 150) which is configured to learn speech representations and generate latent representations 143, quantized latent representations 145, contextual representations 144, and phoneme pairs with speech representations (e.g., phoneme labels 146).

The refinement engine 157 is configured to further refine the machine learning model based on a refinement dataset. The refinement engine 157 fine-tunes the machine learning model 148 on a limited labeled dataset corresponding to a low-resource target language and/or target domain.

The computing system is in communication with remote/ third party system(s) 120 comprising one or more processor (s) 122 and one or more computer-executable instruction(s) 124. It is anticipated that, in some instances, the remote/third party system(s) 120 further comprise databases housing data that could be used as training data, for example, audio data not present in local storage. Additionally, or alternatively, the remote/third party system(s) 120 include machine learning systems external to the computing system 110. The remote/third party system(s) 120 are software programs or applications.

Figure 2:
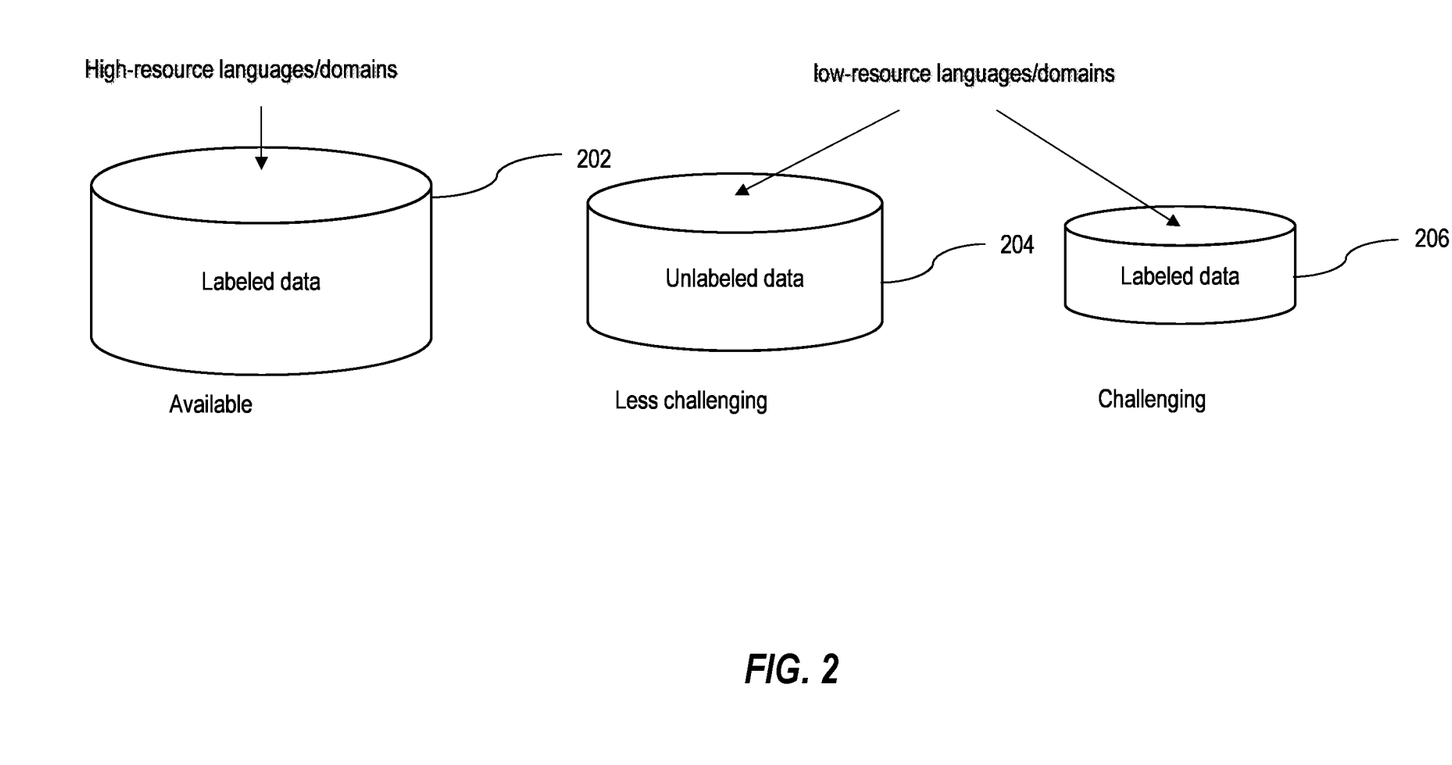
FIG. 2 illustrates an example embodiment for training machine learning models with labeled and/or unlabeled data.

Attention will now be directed to FIG. 2, which illustrates various training data sets, including unlabeled and labeled data. For example, processes for training machine learning models, especially for neural-based training, large amounts of data are required to achieve model efficacy. In learning speech representations, or performing other natural language processing techniques, a model is typically trained using labeled data 202. However, labeled data 202 is typically only available for high-resource languages or high resource domains where large amounts of speech and corresponding transcriptions are already available. For low-resource languages or low-resource domains, training data sets beneficially comprise a combination of unlabeled data 204, which is less challenging to obtain, and labeled data 206, which is more challenging to obtain. Labeled data for low-resource languages/domains is more challenging to obtain because it typically requires human or computationally expensive transcription methods to obtain the labels for the audio speech included in the unlabeled data set. The low resource labeled data 206 corresponds to the low resource unlabeled data 204 or high resource labeled data 202. Alternatively, each data set including as training data is a discrete data set.

The present invention achieves the learning of robust representations across different languages or domains using all accessible data. Specifically, the desirable representations are capable of capturing SR-specific content from the signal, e.g., phoneme identities, while being invariant to confounding details such as the background noise. With such representations, limited amounts of labeled data are sufficient to achieve acceptable performance.

Figure 3A:
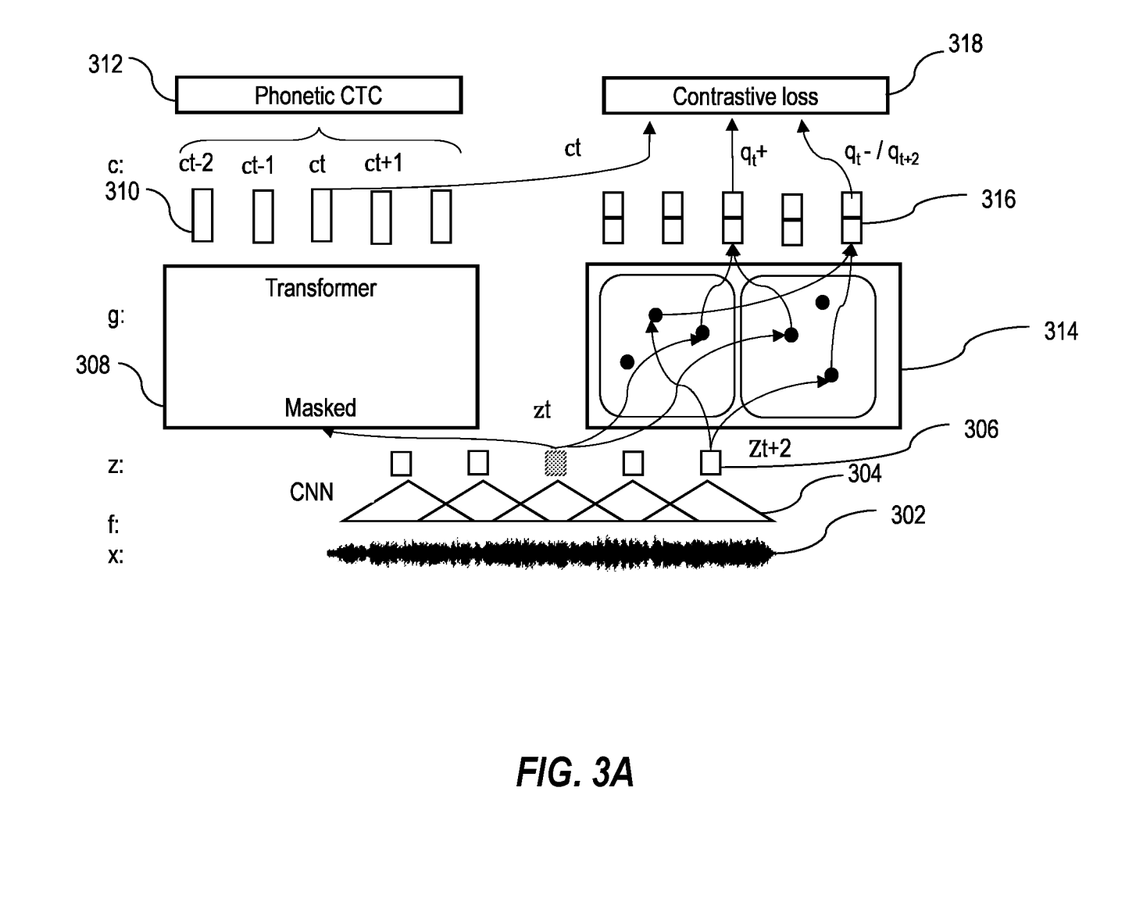
FIG. 3A illustrates a novel embodiment of a process flow diagram for training a machine learning model to learn speech representations.

Attention will now be directed to FIG. 3A, which illustrates a novel process for training a machine learning model to learn and generate speech representations. In this work, a unified approach is disclosed to learn the contextual representations 310 that can be easily generalized and are phonetically aware. The model (e.g., machine learning model 148) includes of a feature extractor 302 (e.g., "f:" a convolutional neural network or convolutional feature encoder) to extract latent representations 306 (e.g., "z:"), a Transformer context network 308 to learn contextual representations 310 and a quantizer 314 (e.g., vector quantizer) to output quantized latent representation 316.

The feature extractor 304 maps raw audio ("x") to a latent space. The feature extractor 304 also is composed of several blocks (e.g., seven blocks) of temporal convolution followed by a layer normalization and an activation layer. The temporal convolutions in each block have a pre-determined number of channels and kernel widths, resulting in each z latent representation representing about 25 ms of audio segmented by 20 ms. After the audio is encoded to the latent space, the latent representations 306 are fed into the transformer context network 308 to output the contextual representations 310.

Figure 4:
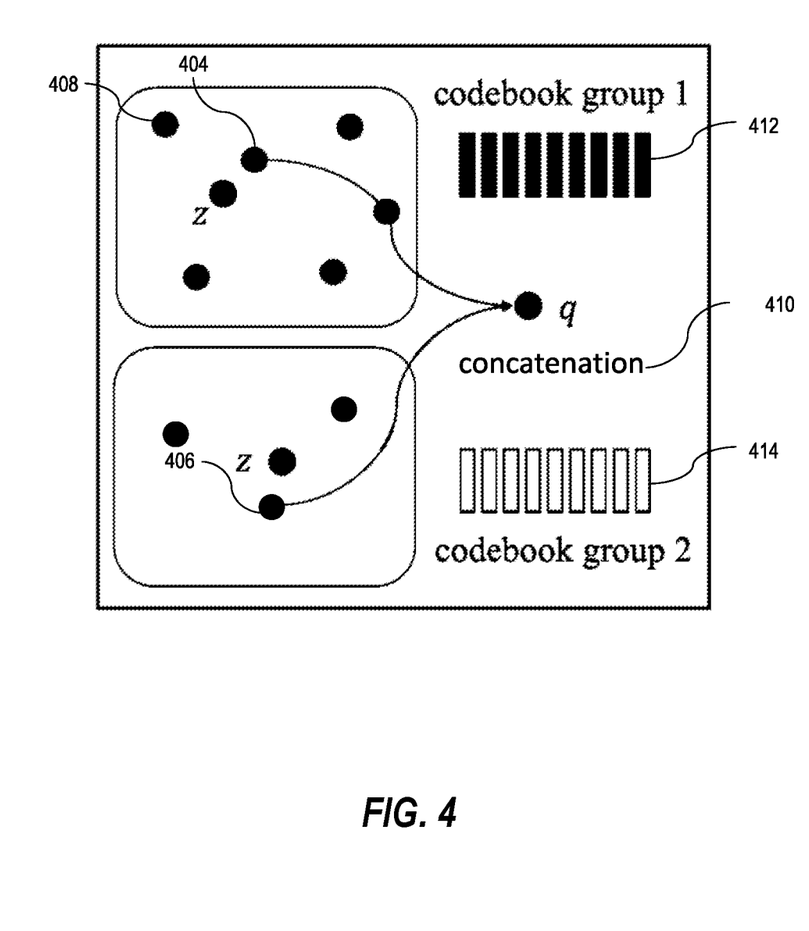
FIG. 4 illustrates one embodiment for the concatenation of a set of codebooks.

The transformer context network 308 is equipped with a convolutional layer with a pre-determined kernel size and pre-determined number of groups to replace absolute positional embedding. Acting as an information filter on the latent representations 306, the quantizer 314 discretizes the latent representations 306 to a finite set of speech representations or quantized latent representations 316. As shown in FIG. 4, the quantizer 314 includes a plurality of codebooks (e.g., codebook 412 and codebook 414) with a plurality of entries included in each codebook.

The input features to the transformer model are randomly masked, while the features are unmasked when fed to the quantized layer. The output of the encoder (e.g., "z") is mapped to the nearest point from the codebook. (See FIG. 4). The model is first pre-trained or trained on the labeled high-resource data and unlabeled low-resource data. Then the computing system freezes one or more layers of the feature extractor 304 and fine-tunes or refines the Transformer on a small amount of labeled low-resource data. In the pre-training stage, the model is trained in a multitask learning manner.

For high-resource labeled data, the model is trained for two objectives: the first is a sequence-level CTC loss applied to phoneme labels for phonetic representation learning; the second is a contrastive task defined over the contextual representations 310 that are masked and the discrete latent representations. The CTC loss aligns each contextual representation with a phoneme label. Meanwhile, the contrastive loss 318 implicitly closes the space gap between discrete latent representations and contextual representations 310, so that each codeword from the codebook can also be aligned with a meaningful phoneme unit. However, this simple multitask learning method leads to limited improvements. Thus, the computing system is configured to further explicitly guide the quantizer 314 to learn SR-specific information.

The machine learning model is trained on various datasets, including one or more datasets from high-resource settings. Such datasets contain a large number of audio-text pairs. The machine learning model is also trained on one or more datasets from low-resource languages/domains. For each low resource language/domain, the datasets include a large unlabeled dataset and a smaller labeled dataset. The goal is to leverage accessible large datasets to learn robust representations and then refine the model on the smaller datasets to improve the ASR performance on the low-resource languages/domains.

In training the machine learning model, the representations are learned with the following two features: 1) Each frame's (e.g., frame of the speech data fed into the feature extractor) representation corresponds to a meaningful phonetic unit. (2) The representation is easy to adapt to the target domain SR task.

To achieve this, a multitask learning method is performed with unified representation. In the pre-training stage, the computing system jointly trains the model on a high-resource labeled data and a low-resource data. Training objectives include 1) Phonetic CTC 312 loss on the high resource labeled dataset. It makes sure the learnt contextual representation contains phoneme-level features. 2) Contrastive loss 318 on the high resource labeled dataset. The loss is calculated on the representations c and the discrete features q, with the hope that it can learn phonetically aware codebooks. (3) Contrastive loss 318 on a low-resource unlabeled dataset. It adapts the model on the target domain. (4) Fine-tuning on a low resource labeled dataset. This step refines the machine learning model to improve the ASR performance.

Specifically, given a data pair, the model learns its contextual representations (e.g., c1, . . . , ct). In some training procedures, a linear layer with SoftMax function is added to predict a distribution over observed labels, including phoneme tokens and a blank token. The CTC objective trains the model to maximize the sum of conditional probability of all possible representational paths. Through CTC supervised learning, the machine learning model can map each frame's representation (Ct) to a phonetic unit explicitly. However, the learnt representation is located in the source domain and it is hard to be transferred to a target scenario with only limited labeled data. In order to generalize this model, self-supervised contrastive learning is leveraged using both labeled source data and unlabeled target data.

Given audio data or speech data, the model can obtain feature representations or latent representations 306 (e.g., Z1-Zt) with the feature extractor 304. During training, some frames of the audio or speech data are masked, wherein the masked features are fed into the Transformer context network 308. The model uses the quantizer output (e.g., output q) as the contrastive targets, while input to the quantizer 314 is unmasked.

Attention will now be directed to FIG. 4. As shown in the figure, one discrete entry (e.g., unit 408) from each codebook is chosen based on a probability (e.g., "soft" alignment). In a forward pass, the quantizer 314 finds a nearest prototype to the input "z" (e.g., input 404 and input 406) from each codebook. The resulting vectors are concatenated (e.g., concatenation 410), and a linear transformation is applied to obtain q. In the backward pass, the gradient of the loss with respect to the pre-quantized vector "z" is approximated.

Referring back to FIG. 3A, for each "Ct" centered over a masked time step "t", the model needs to identify the true quantized latent speech representations "Qt" in a set of quantized candidates or distractors. The distractors are uniformly sampled from the other timesteps from the same utterance. This frees up the model from using its capacity to represent speaker-dependent information and instead focuses the analysis on semantic features. The contrastive loss 318 encourages the quantizer 314 to produce vectors which lie close to the contextual representations 310 "c". As the model is trained on the joint set of high-resource labeled dataset and low-resource unlabeled dataset, the codebook can generalize at both the source domain and the target domain.

The quantizer 314 or quantization model is configured to learn a representation which separates phonetic content within an utterance from the speaker identity. It also discovers the tokens learned in an unsupervised manner, wherein the tokens can be mapped to phonemes in a limited setting. To ensure that the discrete representations are as useful as those learned by the supervised learning for the ASR tasks, when calculating the CTC loss, the continuous representation "c" is replaced with its quantized versions "q" with probability "r". By predicting the phoneme sequences with the quantized latent representations 316, the computing system can explicitly guide the quantizer 314 to cluster phonemes and learn SR specific knowledge to be included in the codebooks. Because the outputs from the supervised learning and the unsupervised learning are forced to project into the same latent space, the model avoids the two objective functions optimizing individually.

Figure 3B:
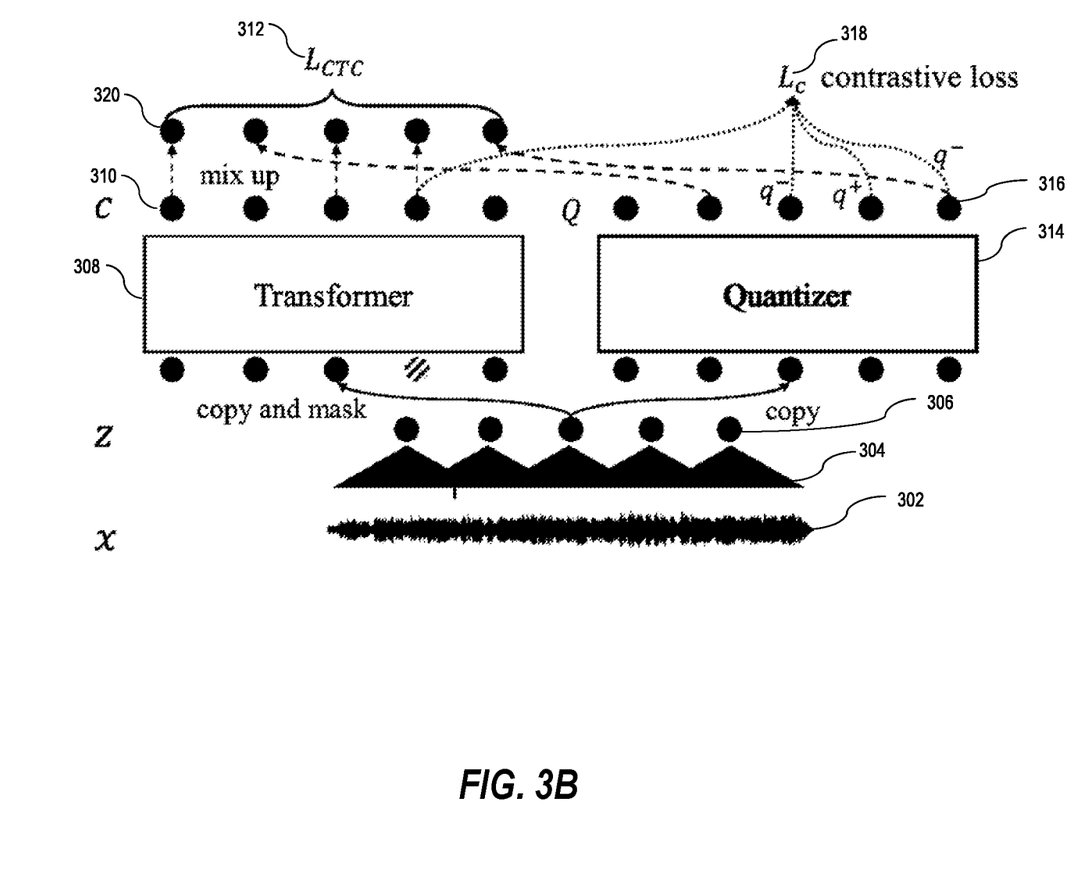
FIG. 3B illustrates a novel embodiment of a process flow diagram for training a machine learning model to learn speech representations by randomly replacing certain transformer outputs with quantizer outputs before performing loss functions.

Attention will now be directed to FIG. 3B, which illustrates a novel technique for processing the various outputs of the machine learning model to learn the speech representations. For example, the computing system randomly replaces a proportion of the contextual representations 310 with quantized latent representations 316 in the corresponding time steps and calculates the CTC loss upon the mixed representations (e.g., mixed representations 320). In this way, the CTC objective directly guides the quantizer 314 to learn a phonetically aware codebook. For those low-resource unlabeled data, only contrastive learning is conducted. As the codebook is already located in the phonetic level, the model is easily adapted to a new target domain.

The trained machine learning model is then able to perform various natural language processing tasks in different environments. For example, the disclosed embodiments perform more robustly over conventional techniques in settings such as (1) one-to-one tasks (e.g., single high resource language to single low resource language); (2) many-to-one tasks (e.g., multi-lingual high resource languages to single low resource language; and/or (3) many-to-many tasks (e.g., multi-lingual high resource languages to multi-lingual low resource languages. The machine learning model also achieves improved word error rate reductions for the domain transfer task against conventional baselines.

For ASR on multi-lingual audio data, the machine learning model is trained on one or more high resource languages and then transferred to low-resource languages. The high resource language dataset comprises more than 5k hours of speech data in over 60 languages. For fine-tuning, the dataset comprises about 1 hour of paired data for training, about 20 minutes for validation, and about 1 hour for testing. The phoneme transcriptions are retrieved by running open source phonemizer and report phone error rate (PER) for each language.

In the one-to-one multilingual ASR task, the machine learning model is trained or pre-trained on a high resource language labeled dataset (e.g., for English) and a low-resource unlabeled dataset. After pre-training, the model is fine-tuned on low resource labeled data.

In the many-to-one multilingual ASR task, the machine learning model is trained or pretrained on a plurality of labeled datasets for high resource languages/domains. During pre-training, multilingual batches are formed by sampling speech utterances from a multinomial distribution. The performances are evaluated on other low-resource languages. The monolingual unlabeled data for each low-resource target language or domain is also used to train the model.

In the many-to-many multilingual ASR task, the machine learning model is trained or pre-trained on the multilingual high-resource data set comprising speech data for a plurality of high resource languages/domains. A training dataset for the low-resource languages is formed by merging datasets comprising unlabeled speech data for low-resource languages/domains and pre-training the model on the joint set. Phoneme vocabularies are either shared or separated across low-resource languages.

Figure 5:
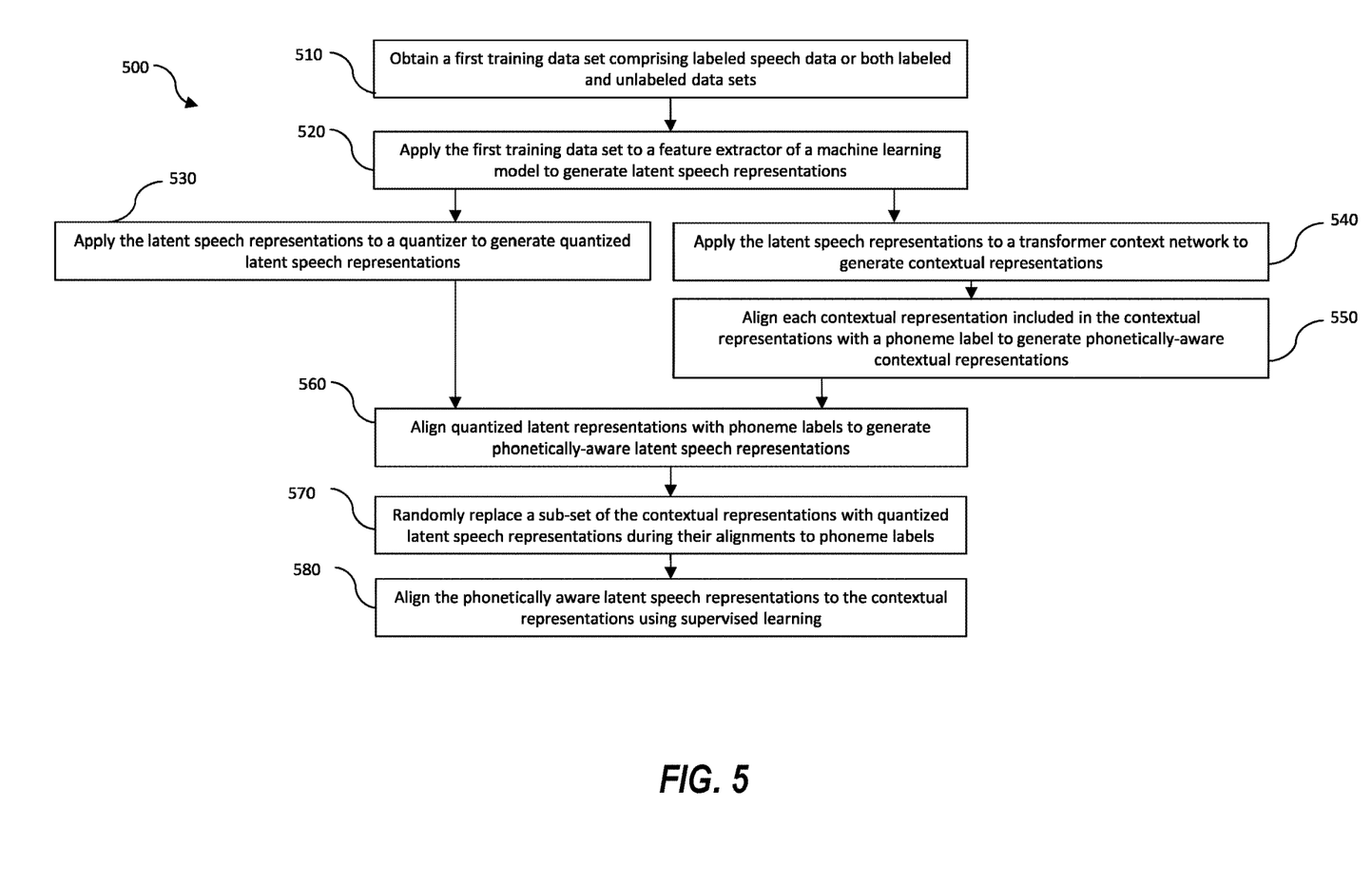
FIG. 5 illustrates one embodiment of a flow diagram having a plurality of acts for training a machine learning model to learn and generate phonetically aware speech representations.

Attention will now be directed to FIG. 5 which illustrates a flow diagram 500 that includes various acts (act 510, act 520, act 530, act 540, act 550, act 560, act 570, and act 580) associated with exemplary methods that can be implemented by computing system 110 for obtaining training data and training a machine learning model for learning speech representations.

The first illustrated act includes an act of obtaining a first training data set comprising labeled speech data or both unlabeled and labeled data sets (act 610). The computing system then applies the first training data set to a feature extractor of a machine learning model to generate latent speech representations (act 520). The latent speech representations are applied to a quantizer 314 to generate quantized latent speech representations (act 530). The latent speech representations are also applied to a transformer context network 308 to generate contextual representations (act 540).

Subsequently, the computing system aligns each contextual representation included in the contextual representations with a phoneme label to generate phonetically aware contextual representations (act 550) and aligns quantized latent representations with phoneme labels to generate phonetically aware latent speech representations (act 560).

The computing system randomly replaces a sub-set of the contextual representations with quantized latent speech representations during their alignments to phoneme labels (act 570) and align the phonetically aware latent speech representations to the contextual representations using supervised learning (act 580).

The computing system obtains a second training data set comprising unlabeled speech data corresponding to a target speech domain or a target language and trains the machine learning model on the second training data set using self-supervised learning.

The computing system also performs contrastive loss 318 to minimize a first distance between the contextual speech representations and a set of corresponding positive quantized latent speech representations and maximize a second distance between the contextual speech representations and a set of corresponding negative quantized latent speech representations, during training of the machine learning model on the second training data set using self-supervised learning.

The computing system is further configured to obtain a third training data set comprising labeled speech data corresponding to a target speech domain or a target language and apply the third training data set to the transformer context network 308 to adapt the machine learning model to the target speech domain.

The one or more computer-readable instructions are further executable by the one or more processors to further configure the computing system to apply the third training data set to the transformer context network 308 further by performing character-based or token-based CTC loss.

The computing system accesses a codebook comprising a set of codewords for discrete latent representations, obtains a set of phoneme labels, and aligns each codeword included the set of codewords to a particular phoneme label included in the set of phoneme labels.

The one or more computer-readable instructions are further executable by the one or more processors to further configure the computing system to align the phonetically aware latent speech representations to the contextual representations to minimize a prediction loss from the phonetically aware latent speech representations or the contextual representations to phoneme labels by performing phonetic connectionist temporal classification (CTC) loss.

The first training data set comprising labeled speech data further comprises labeled and/or unlabeled speech data for a plurality of languages.

The one or more computer-readable instructions being further executable by the one or more processors to further configure the computing system to align the contextual representations with the phoneme label at a sequence-level.

Figure 6:
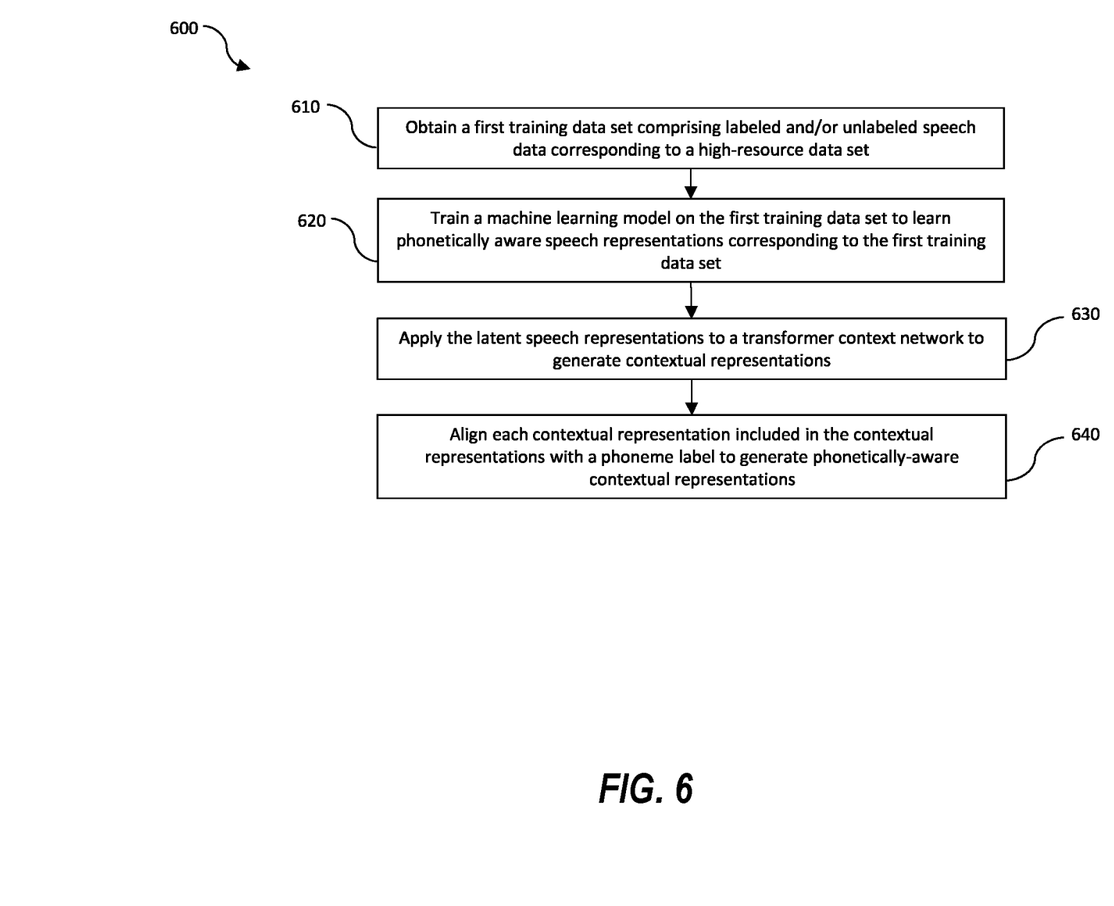
FIG. 6 illustrates another embodiment of a flow diagram having a plurality of acts training a machine learning model to learn and generate phonetically aware speech representations.

Attention will now be directed to FIG. 6 which illustrates a flow diagram 600 that includes various acts (act 610, act 620, act 630, and act 640) associated with exemplary methods that can be implemented by computing system 110 for obtaining training data and training a machine learning model for learning speech representations.

The first illustrated act includes an act of obtaining a first training data set comprising labeled and/or unlabeled speech data corresponding to a high-resource data set (act 610). A machine learning model is then trained on the first training data set to learn phonetically aware speech representations corresponding to the first training data set (act 620). The computing system also obtains a second training data set comprising unlabeled speech data corresponding to a low-resource data set (act 630) and trains the machine learning model on the second training data set using self-supervised learning (act 640).

The computing system obtains a third training data set comprising labeled speech data corresponding to a low resource data set for a target domain or a target language and trains the machine learning model on the third training data set to adapt the machine learning model to a target domain or target language.

Before training the machine learning model on the third training data set to adapt the machine learning model to the target domain, the computing system freezes or unfreezes a feature extractor of the machine learning model based on a data size of the third training data set.

The computing system obtains a set of contextual representations based on the first training data set, trains the machine learning model on the first training data set to align the set of contextual representations to a set of phoneme labels such that each contextual representation corresponds to a phoneme label, obtains a set of latent representations based on the first training data set, and trains the machine learning model on the first training data set to align the set of latent representations to the set of contextual representations.

The computing system is further configured to train the machine learning model on the first training data set to align a set of contextual representations to a set of phoneme labels such that each contextual representation corresponds to the phoneme label by performing connectionist temporal classification loss at a sequence level.

The computing system is used to train the machine learning model on the first training data set to identify a sub-set of correct quantized latent speech representation in a set of distractors by performing contrastive loss between a set of negative latent representations, a set of positive latent representations, and a set of masked contextual representations.

The computing system accesses a codebook comprising a set of codewords for discrete latent representations and aligns each codeword included the set of codewords to a phoneme label included in a set of phoneme labels.

The computing system also calculates a probability that a particular codeword corresponds to a particular phoneme label and aligns the particular codeword to the particular phoneme label when the probability meets or exceeds a pre-defined threshold.

The computing system is configured to distinguish a sub-set of correct quantized latent speech representation from a set of distractors by using correct contextual representation.

Aligning contextual representations with a phoneme label to generate phonetically aware contextual speech representations further comprises (1) calculating a probability that a particular contextual representation corresponds to a particular phoneme label, and (2) aligning the particular contextual representation to the particular phoneme label when the probability meets or exceeds a pre-defined threshold.

In view of the foregoing, it will be appreciated that the disclosed embodiments provide many technical benefits over conventional systems and methods for generating machine learning training data configured to train a machine learning model to learn speech representations. The disclosed embodiments beneficially improve conventional techniques for learning and generating speech representations.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-executable instructions 118 of FIG. 1) are physical hardware storage media/devices that exclude transmission media. Computer-readable media that carry computer-executable instructions or computer-readable instructions (e.g., computer-executable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable instructions that are executable by the one or more processors to configure the computing system to at least:
obtain a first training data set comprising labeled speech data or both labeled and unlabeled data corresponding to a high-resource data set, as well as latent speech representations based on the first training data set;
train a machine learning model on the first training data set to learn phonetically aware speech representations corresponding to the first training data set;
apply the latent speech representations from the machine learning model to a transformer context network to generate contextual representations;
align each contextual representation included in the contextual representations with a phoneme label to generate phonetically-aware contextual representations; and
cause a refinement engine to further refine the machine learning model based on a refinement dataset, wherein the refinement engine fine-tunes the machine learning model on a limited labeled dataset corresponding to a low-resource target language and/or target domain; and
transform at least some of the contextual representations by randomly replacing a sub-set of the contextual representations with quantized latent speech representations.

2. The computing system of claim 1, the one or more computer-readable instructions being further executable by the one or more processors to further configure the computing system to:
before refining the machine learning model on the refinement dataset, which operates to adapt the machine learning model to the target domain, freeze or unfreeze a feature extractor of the machine learning model based on a data size of the refinement dataset.

3. The computing system of claim 1, the one or more computer-readable instructions being further executable by the one or more processors to further configure the computing system to:
obtain a set of contextual representations based on the first training data set;
train the machine learning model on the first training data set to align the set of contextual representations to a set of phoneme labels such that each contextual representation corresponds to a phoneme label;
obtain a set of latent representations based on the first training data set; and
train the machine learning model on the first training data set to align the set of latent representations to the set of contextual representations.

4. The computing system of claim 1, the one or more computer-readable instructions being further executable by the one or more processors to further configure the computing system to train the machine learning model on the first training data set to align a set of contextual representations to a set of phoneme labels such that each contextual representation corresponds to the phoneme label by performing connectionist temporal classification loss at a sequence level.

5. The computing system of claim 1, the one or more computer-readable instructions being further executable by the one or more processors to further configure the computing system to train the machine learning model on the first training data set to identify a sub-set of correct quantized latent speech representation in a set of distractors by performing contrastive loss between a set of negative latent representations, a set of positive latent representations, and a set of masked contextual representations.

6. The computing system of claim 1, the one or more computer-readable instructions being further executable by the one or more processors to further configure the computing system to:
access a codebook comprising a set of codewords for discrete latent representations; and
align each codeword included the set of codewords to a phoneme label included in a set of phoneme labels.

7. The computing system of claim 6, the one or more computer-readable instructions being further executable by the one or more processors to further configure the computing system to:
calculate a probability that a particular codeword corresponds to a particular phoneme label; and
aligns the particular codeword to the particular phoneme label when the probability meets or exceeds a pre-defined threshold.

8. A method comprising:
obtaining a first training data set comprising labeled speech data or both labeled and unlabeled data corresponding to a high-resource data set, as well as latent speech representations based on the first training data set;
training a machine learning model on the first training data set to learn phonetically aware speech representations corresponding to the first training data set;
applying the latent speech representations from the machine learning model to a transformer context network to generate contextual representations;
aligning each contextual representation included in the contextual representations with a phoneme label to generate phonetically-aware contextual representations;
causing a refinement engine to further refine the machine learning model based on a refinement dataset, wherein the refinement engine fine-tunes the machine learning model on a limited labeled dataset corresponding to a low-resource target language and/or target domain; and
transforming at least some of the contextual representations by randomly replacing a sub-set of the contextual representations with quantized latent speech representations.

9. The method of claim 8, the method further comprising:
before refining the machine learning model on the refinement dataset, which operates to adapt the machine learning model to the target domain, freezing or unfreezing a feature extractor of the machine learning model based on a data size of the refinement dataset.

10. The method of claim 8, the method further comprising:
obtaining a set of contextual representations based on the first training data set;
training the machine learning model on the first training data set to align the set of contextual representations to a set of phoneme labels such that each contextual representation corresponds to a phoneme label;
obtaining a set of latent representations based on the first training data set; and
training the machine learning model on the first training data set to align the set of latent representations to the set of contextual representations.

11. The method of claim 8, the method further comprising training the machine learning model on the first training data set to align a set of contextual representations to a set of phoneme labels such that each contextual representation corresponds to the phoneme label by performing connectionist temporal classification loss at a sequence level.

12. The method of claim 8, the method further comprising training the machine learning model on the first training data set to identify a sub-set of correct quantized latent speech representation in a set of distractors by performing contrastive loss between a set of negative latent representations, a set of positive latent representations, and a set of masked contextual representations.

13. The method of claim 8, the method further comprising:
accessing a codebook comprising a set of codewords for discrete latent representations; and
aligning each codeword included the set of codewords to a phoneme label included in a set of phoneme labels.

14. The method of claim 13, the method further comprising:
calculating a probability that a particular codeword corresponds to a particular phoneme label; and
aligning the particular codeword to the particular phoneme label when the probability meets or exceeds a pre-defined threshold.

15. One or more hardware storage devices that store instructions that are executable by one or more processors to cause the one or more processors to:
obtain a first training data set comprising labeled speech data or both labeled and unlabeled data corresponding to a high-resource data set, as well as latent speech representations based on the first training data set;
train a machine learning model on the first training data set to learn phonetically aware speech representations corresponding to the first training data set;
apply the latent speech representations from the machine learning model to a transformer context network to generate contextual representations;

align each contextual representation included in the contextual representations with a phoneme label to generate phonetically-aware contextual representations;

cause a refinement engine to further refine the machine learning model based on a refinement dataset, wherein the refinement engine fine-tunes the machine learning model on a limited labeled dataset corresponding to a low-resource target language and/or target domain; and transform at least some of the contextual representations by randomly replacing a sub-set of the contextual representations with quantized latent speech representations.

16. The one or more hardware storage devices of claim 15, the instructions being further executable to cause the one or more processors to:

before refining the machine learning model on the refinement dataset, which operates to adapt the machine learning model to the target domain, freeze or unfreeze a feature extractor of the machine learning model based on a data size of the refinement dataset.

17. The one or more hardware storage devices of claim 15, the instructions being further executable to cause the one or more processors to:

obtain a set of contextual representations based on the first training data set;

train the machine learning model on the first training data set to align the set of contextual representations to a set of phoneme labels such that each contextual representation corresponds to a phoneme label;

obtain a set of latent representations based on the first training data set; and train the machine learning model on the first training data set to align the set of latent representations to the set of contextual representations.

18. The one or more hardware storage devices of claim 15, the instructions being further executable to cause the one or more processors to train the machine learning model on the first training data set to align a set of contextual representations to a set of phoneme labels such that each contextual representation corresponds to the phoneme label by performing connectionist temporal classification loss at a sequence level.

19. The one or more hardware storage devices of claim 15, the instructions being further executable to cause the one or more processors to train the machine learning model on the first training data set to identify a sub-set of correct quantized latent speech representation in a set of distractors by performing contrastive loss between a set of negative latent representations, a set of positive latent representations, and a set of masked contextual representations.

20. The one or more hardware storage devices of claim 15, the instructions being further executable to cause the one or more processors to:

access a codebook comprising a set of codewords for discrete latent representations; and align each codeword included the set of codewords to a phoneme label included in a set of phoneme labels.

* * * * *